United States Patent [19]

Benzing, II et al.

[11] Patent Number: 5,746,101
[45] Date of Patent: May 5, 1998

[54] METHOD FOR CUTTING A CORD REINFORCED ELASTOMERIC LAMINATE

[75] Inventors: James Alfred Benzing, II, Stow; William James Head, Ravenna; Daniel Ray Downing, Uniontown; Larry James Gehrett, Atwater; Harold Aloysius Wolbert, North Canton, all of Ohio

[73] Assignee: The Goodyear Tire & Rubber Company, Akron, Ohio

[21] Appl. No.: 758,401

[22] Filed: Nov. 29, 1996

Related U.S. Application Data

[63] Continuation of Ser. No. 369,211, Jan. 5, 1995, abandoned.

[51] Int. Cl.$^6$ .................................................. B26D 1/547
[52] U.S. Cl. .................................. 83/34; 83/56; 83/217; 83/783; 83/581; 83/647; 83/651.1
[58] Field of Search ..................... 83/56, 39, 34, 83/44, 175, 176, 307.1, 307.2, 581, 597, 646, 647, 651.1, 662, 783, 784, 870, 947, 217

[56] References Cited

U.S. PATENT DOCUMENTS

| | | | |
|---|---|---|---|
| 1,320,121 | 10/1919 | Brucker . | |
| 1,353,769 | 9/1920 | MacBeth et al. | 83/56 |
| 1,353,934 | 9/1920 | Morris . | |
| 1,393,164 | 10/1921 | Reinhardt et al. . | |
| 1,502,120 | 7/1924 | Rasmussen . | |
| 1,667,009 | 4/1928 | Matthias . | |
| 1,730,307 | 10/1929 | Stevens . | |
| 1,770,895 | 8/1930 | Abbott, Jr. . | |
| 2,754,887 | 7/1956 | Wykoff . | |
| 2,941,465 | 6/1960 | Zimmerli | 100/155 |
| 3,027,289 | 3/1962 | Gitzinger | 156/132 |
| 3,234,769 | 2/1966 | Bretschneider | 72/238 |
| 3,237,673 | 3/1966 | Ward | 152/354 |
| 3,413,921 | 12/1968 | Boatman | 101/248 |
| 3,509,929 | 5/1970 | Delobelle | 152/354 |
| 3,591,439 | 7/1971 | Leblond et al. | 156/396 |
| 3,803,965 | 4/1974 | Alderfer | 83/155 |
| 4,083,738 | 4/1978 | Kahaner | 156/92 |
| 4,210,042 | 7/1980 | Felten | 83/49 |
| 4,232,723 | 11/1980 | Gazuit | 152/350 |
| 4,334,448 | 6/1982 | Messerschmitt | 83/171 |
| 4,368,633 | 1/1983 | Nogota | 72/239 |
| 4,393,450 | 7/1983 | Jerard | 364/474 |
| 4,465,536 | 8/1984 | Makino et al. | 156/133 |
| 4,466,473 | 8/1984 | Matyja et al. | 152/354 |
| 4,552,007 | 11/1985 | Mantovan | 72/239 |
| 4,653,304 | 3/1987 | Feldmann et al. | 72/239 |
| 4,685,390 | 8/1987 | Pav et al. | 100/168 |
| 4,733,709 | 3/1988 | Lambillotte et al. | 152/548 |

(List continued on next page.)

FOREIGN PATENT DOCUMENTS

| | | |
|---|---|---|
| 0701887 | 3/1996 | European Pat. Off. . |
| 3444612 | 6/1986 | Germany . |
| 59195406 | 11/1984 | Japan . |
| 5221204 | 8/1993 | Japan . |
| 41755 | 7/1962 | Luxembourg . |

*Primary Examiner*—Rinaldi I. Rada
*Assistant Examiner*—Charles Goodman
*Attorney, Agent, or Firm*—David L. King

[57] ABSTRACT

This invention pertains to a method and for cutting an intermediate article of manufacture, the intermediate article of manufacture being a cord reinforced elastomeric laminate. The laminate when cut to length, becomes a carcass for a pneumatic tire. The laminate is cut by a cutting element at angles θ greater than 60° relative to a normal plane (NP) perpendicular to a cord reinforced ply of the laminate and parallel to the cords to thereby create large substantially flat planar splice surfaces without significant deformation or precuring of the unvulcanized elastomeric materials. To facilitate this cut, the relative position of the cutting element and the ply is changed to an angle β, β being less than θ. The ply is cut a short distance, at the angle β, to position the cutting element between two parallel cords. Then the cutting element is reoriented to the angle θ to complete the cut.

10 Claims, 11 Drawing Sheets

U.S. PATENT DOCUMENTS

| | | | |
|---|---|---|---|
| 4,768,575 | 9/1988 | Bruner et al. | 152/552 |
| 4,810,317 | 3/1989 | Lang | 156/134 |
| 4,813,319 | 3/1989 | Weyand, Jr. | 83/22 |
| 4,857,123 | 8/1989 | Still et al. | 156/133 |
| 4,905,493 | 3/1990 | Benedetti | 72/225 |
| 4,946,525 | 8/1990 | Aupic et al. | 156/134 |
| 4,965,733 | 10/1990 | Kimura et al. | 364/474.09 |
| 5,029,502 | 7/1991 | Irie | 83/49 |
| 5,030,079 | 7/1991 | Benzing, II | 425/140 |
| 5,059,274 | 10/1991 | Kumagai | 156/406.4 |
| 5,062,462 | 11/1991 | Rye et al. | 152/548 |
| 5,273,601 | 12/1993 | Sergel et al. | 156/133 |
| 5,327,353 | 7/1994 | Nagano | 364/474 |
| 5,327,807 | 7/1994 | Chang | 83/783 |
| 5,328,532 | 7/1994 | Azuma et al. | 156/134 |
| 5,638,732 | 6/1997 | Becker et al. | 83/461 |

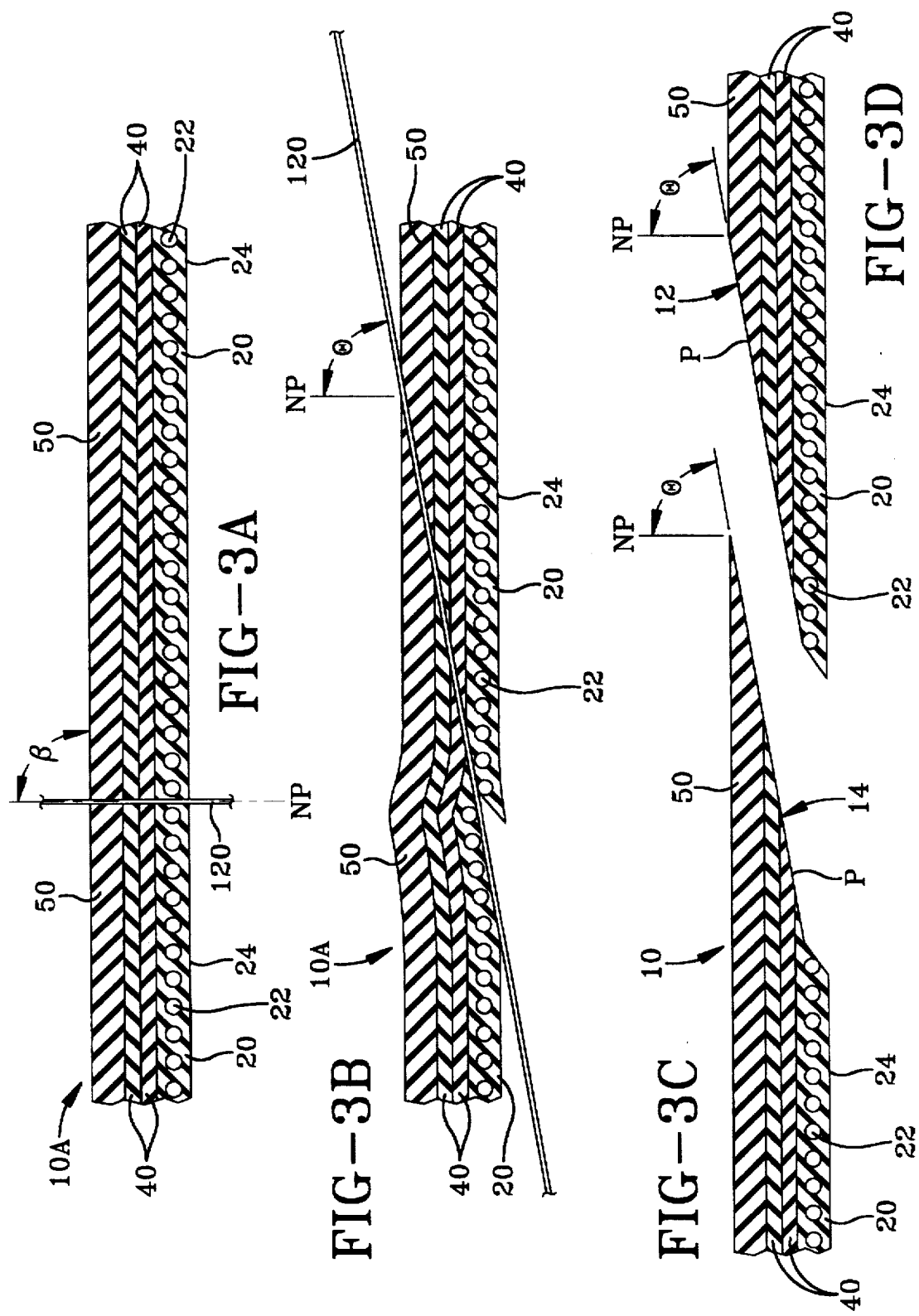

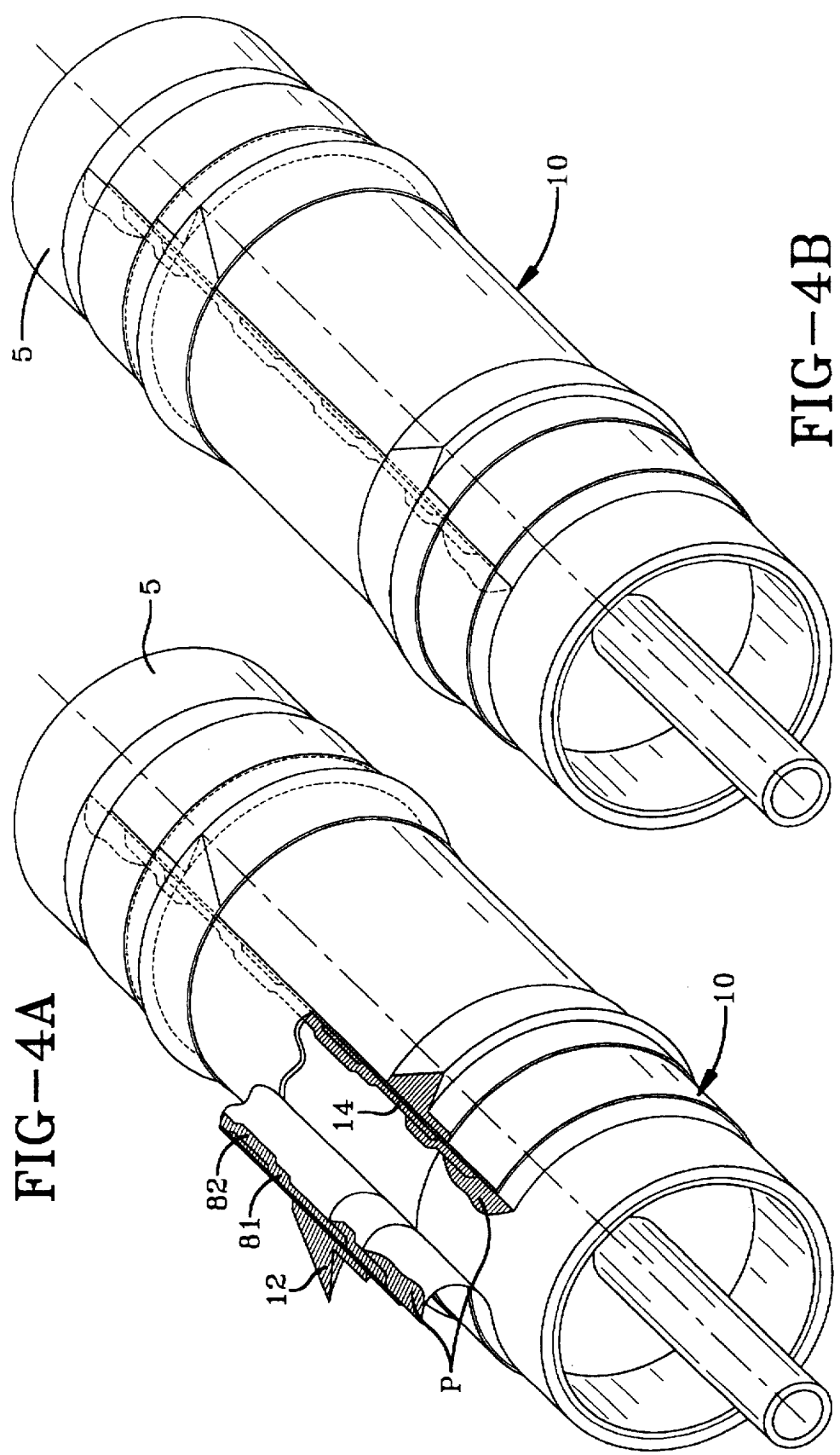

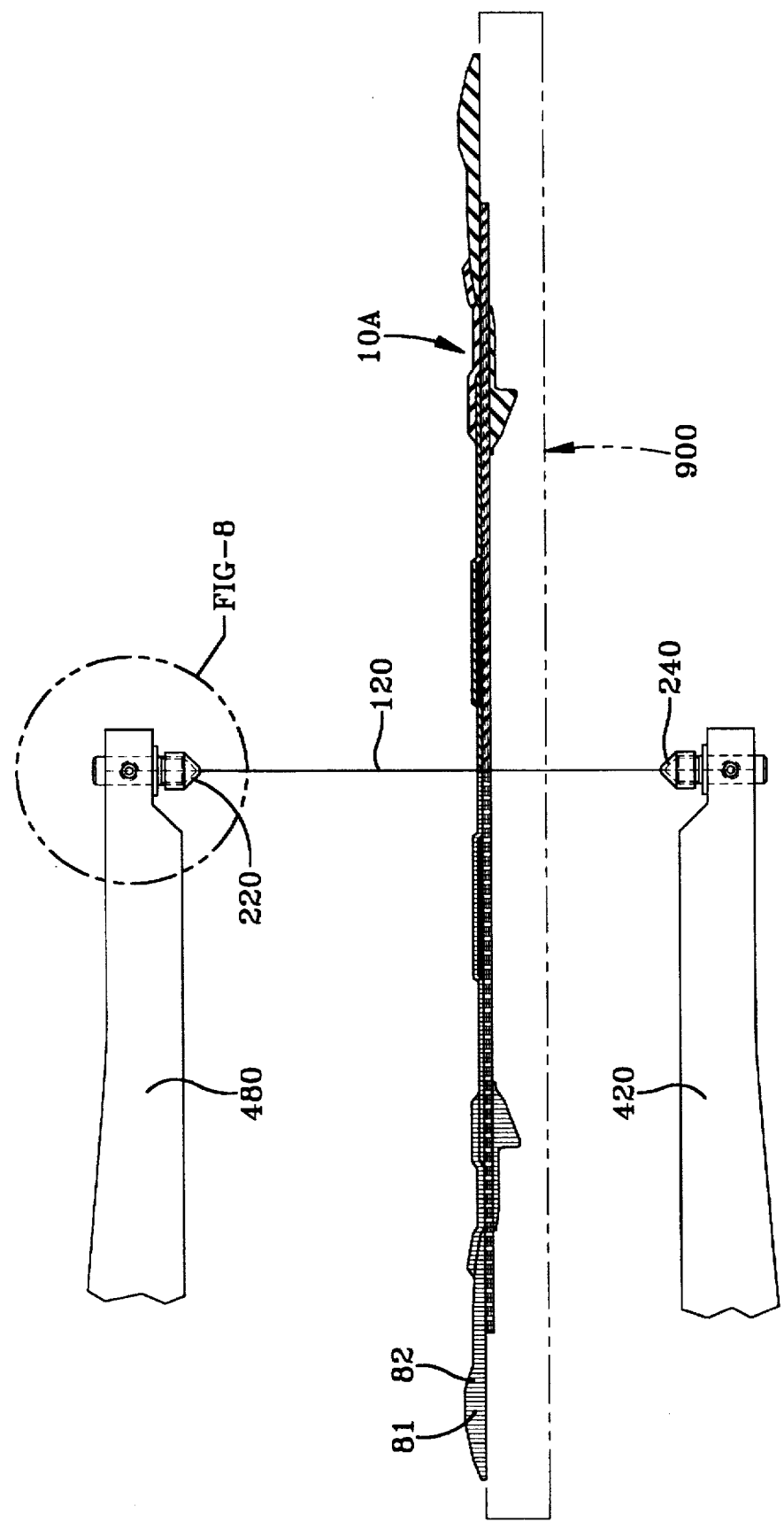

METHOD FOR CUTTING A CORD REINFORCED ELASTOMERIC LAMINATE

This is a continuation of application Ser. No. 08/369,211 filed Jan. 5, 1995, now abandoned.

BACKGROUND OF THE INVENTION

This invention pertains to a unique method and apparatus 100 for cutting an intermediate article of manufacture, the intermediate article of manufacture being a cord reinforced elastomeric laminate structure 10A. More specifically, the invention relates to methods and apparatus for cutting an unvulcanized cord reinforced elastomeric laminate 10A, the cut-to-length laminate being a carcass 10 which is formed into a cylindrical shape at a tire building station and is a subassembly of a radial ply pneumatic tire. The invention describes a method for cutting a carcass for a radial ply passenger tire, but it is equally applicable to light truck, medium truck, agricultural, off-the-road and other radial ply tire carcass constructions.

The manufacturing technologies employed to build a tire involve assembling the many tire components from flat strips or sheets of elastomeric material. Each component is placed on a building drum and cut to length such that the ends of the component meet or overlap creating a splice. Many methods and apparatus for cutting elastomeric materials are known in the art. These prior art cutting methods and apparatus included cutting wheels, ultrasonic cutters, scissor type cutters and guillotine knives. A significant disadvantage in these prior art methods was the inability to cut the ply without cutting or damaging the cords. Another major disadvantage was the inherent difficulty experienced when trying to cut the cord reinforced component at an angle other than perpendicular to the ply's length. For this reason, when building a laminate tire carcass, the tire builder generally would use butt or lap splices. The preferred prior art method uses circumferentially spaced lap splices.

The apparatus of the present invention can cut a cord reinforced laminate at angles heretofore believed unachievable without significant deformation or precuring of the unvulcanized elastomeric material. This can be done precisely and quickly. The cutting means provides improvements to these splice surfaces. The splice quality of the cut elastomeric materials is greatly enhanced vastly improving the adhesion of the components during subsequent tire building and vulcanization processes.

SUMMARY OF THE INVENTION

In accordance with the present invention, a new and improved method and apparatus 100 for cutting a cord reinforced elastomeric laminate 10A is disclosed.

The laminate 10A has a length L and a width W. The laminate 10A includes at least one cord reinforced elastomeric ply 20 and a plurality of elastomeric components laminated to the ply. The ply 20 has parallel cords 22 oriented at an angle 65° to 90° relative to the length of the laminate 10A.

The method of cutting the laminate 10A includes the step of cutting the laminate 10A across a majority of its width at an angle θ, θ being greater than 60° relative to a plane (NP) perpendicular to the ply and parallel to the cords 22 in the ply, the cutting being accomplished by passing a cutting element 120 through the ply and laminated components from one side of the laminate 10A to the other side until the ply 20 and other laminated components are cut, the cutting element 120 being passed between two adjacent parallel cords 22 of the ply 20 in the region of the ply 20.

In a preferred method the cutting element 120 is oriented at an angle θ of about 80°. The cutting element 120, as it traverses through the cord reinforced elastomeric ply 20, is preferably guided by an adjacent cord 22 along the cutting path.

Due to the close spacing of the cords 22 it is also preferable to change the relative position of the cutting element 120 and the ply 20 to an angle β just prior to the cutting element 120 entering the ply, β being measured relative to the plane (NP), the plane (NP) being perpendicular to the ply 20 and parallel to the cords 22, β being less than θ, preferably 45° or less, most preferably about 0° relative to the plane (NP) or in other words, perpendicular to the ply's length. After cutting into the ply 20 a short distance sufficient to position the cutting element 120 between two parallel cords 22, the cutting element is then reoriented relative to the ply 20 to the angle θ and continuing to cut the laminate 10A across its width.

The preferred method also includes the step of oscillating the cutting element 120 as it cuts through the laminate 10A.

Another preferred method of cutting an uncured rubber laminate 10A, the laminate 10A being of a fixed width and length longer than required to form a carcass 10 is described below. The laminate 10A after cutting is used to form a carcass 10 for a radial ply pneumatic tire, the laminate having a ply 20 that becomes radially oriented in the tire, the ply being reinforced by parallel cords and two or more non-reinforced elastomeric components laminated to the ply 20. The method of cutting has the steps of: a) supporting the laminate 10A at a position spaced from a cutting element 120; b) urging the cutting element 120 into cutting engagement with the laminate 10A; c) orienting the cutting element 120 at an angle θ being 60° or more, preferably being 70° or more; d) cutting the laminate 10A across a majority of its width and thickness while maintaining a majority of the portion of the cutting element 120 that engages the laminate 10A at the angle θ, the cutting element 120 being guided by adjacent parallel cords in the region of the ply 20; e) moving the cut laminate 10A a predetermined distance in a direction parallel with its length; and cutting the laminate 10A a second time with the cutting element 120 repeating steps c, d, and e above, thereby forming a cut section of laminate 10A having surface areas 12,14 at the sections opposite ends 12,14, the surface areas 12,14 being spaced a predetermined distance required to enable the ends 12,14 to be spliced together in forming a cylindrical carcass 10 from the cut section. In this method, the cutting element 120 is preferably a wire, the wire being oscillated in a reciprocating motion to create a cut. The peak-to-peak amplitude is preferably limited to less than 25 mm.

The apparatus 100 for cutting the cord reinforced elastomeric laminate 10A has a means 102 for cutting the laminate 10A across a majority of its width at an angle θ of substantially greater than 60° relative to a plane (NP) perpendicular to the ply 20 and parallel to the cords 22. The means 102 for cutting has a cutting element 120 for cutting the laminate 10A and passing between the adjacent parallel cords 22 in the ply 20. The means 102 for cutting also has a means 700 for moving the cutting element 120 across the width of the laminate 10A and a means for orienting the cutting element 120 angularly in planes parallel to the cords 22.

The preferred apparatus has a means 900 for supporting the laminate and a means 600 for creating reciprocating movement of the cutting element 120. The cutting element 120 is preferably a wire.

BRIEF DESCRIPTION OF THE DRAWINGS

FIGS. 3A, 3B, 3C and 3D are enlarged transverse views of the cut parallel to the cord path of the laminate being cut by the cutting element.

FIGS. 4A and 4B are perspective views of the carcass being cylindrically formed on a building drum depicting both cut ends, FIG. 4A showing a portion of the cut ends 12,14 prior to being spliced.

FIG. 7 is an enlarged view cutting means of the apparatus shown in FIG. 6.

DEFINITIONS

"Apex" means an elastomeric filler located radially above the bead core and between the plies and the turnup ply.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Chafers" refers to narrow strips of material placed around the outside of the bead to protect cord plies from the rim, distribute flexing above the rim, and to assist in sealing the tire.

"Cord" means one of the reinforcement strands of which the plies in the tire are comprised.

"Innerliner" means the layer or layers of elastomer or other material that form the inside surface of a tubeless tire and that contain the inflating fluid within the tire.

"Ply" means a continuous layer of rubber-coated parallel cords.

"Radial" and "radially" mean directions radially toward or away from the axis of rotation of the tire.

"Radial ply tire" means a belted or circumferentially-restricted pneumatic tire in which the ply cords which extend from bead to bead are laid at cord angles between 65° and 90° with respect to the equatorial plane of the tire.

"Shoulder" means the upper portion of sidewall just below the tread edge.

"Shoulder gum strip" means an elastomeric reinforcement located in the shoulder region of the carcass.

"Sidewall" means that portion of a tire between the tread and the bead.

"Tread" means a rubber component which when bonded to a tire carcass includes that portion of the tire that come into contact with the road when the tire is normally inflated and under normal load.

DETAILED DESCRIPTION OF THE PREFERRED EMBODIMENT

Referring to FIGS. 1, 2A, 2B and 3A, 3B, 3C and 3D there is illustrated an intermediate article of manufacture 10, the intermediate article of manufacture 10 being a cut-to-length laminate, the cut-to-length laminate being a carcass 10 for a radial ply pneumatic tire.

Figure 1:
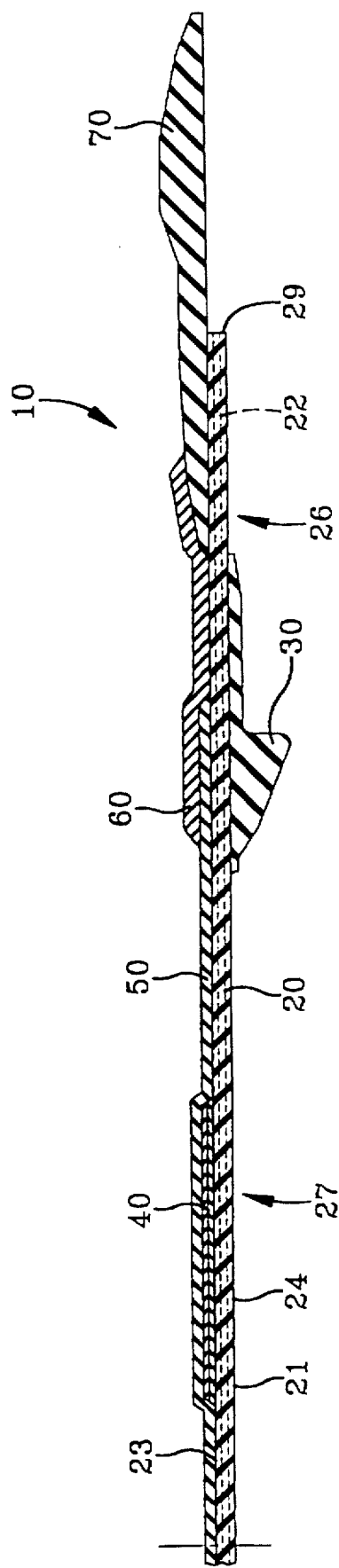
FIG. 1 illustrates one half of the laminate 10A shown in cross section as taken along lines 1—1 of FIG. 2A, the laminate 10A after being cut-to-length forms a carcass for a pneumatic tire.

FIG. 1 illustrates the intermediate article of manufacture 10, the article as shown is one-half of a tire carcass 10, the portion of the carcass not illustrated being identical to the illustrated portion. The figure shows the carcass 10 as a flat laminate composite structure having first and second cut ends 12, 14 at the longitudinal extremes of the carcass 10 and comprising many elastomeric components. As shown all the components are either sheets or strips of material of substantially the same length. Each component shown is precisely located laterally relative to one another. The article and the method and apparatus for producing this laminated structure is disclosed in co-pending applications entitled "A PNEUMATIC TIRE AND AN UNVULCANIZED CARCASS AS AN INTERMEDIATE ARTICLE IN ITS MANUFACTURE" and "A METHOD AND APPARATUS FOR BUILDING A LAMINATE AND FORMING A CARCASS FOR A TIRE FROM AN ASSEMBLY OF TIRE COMPONENTS," Ser. Nos. 08/369,026 and 08/369,192 respectively which are incorporated herein by reference.

Figure 2A:
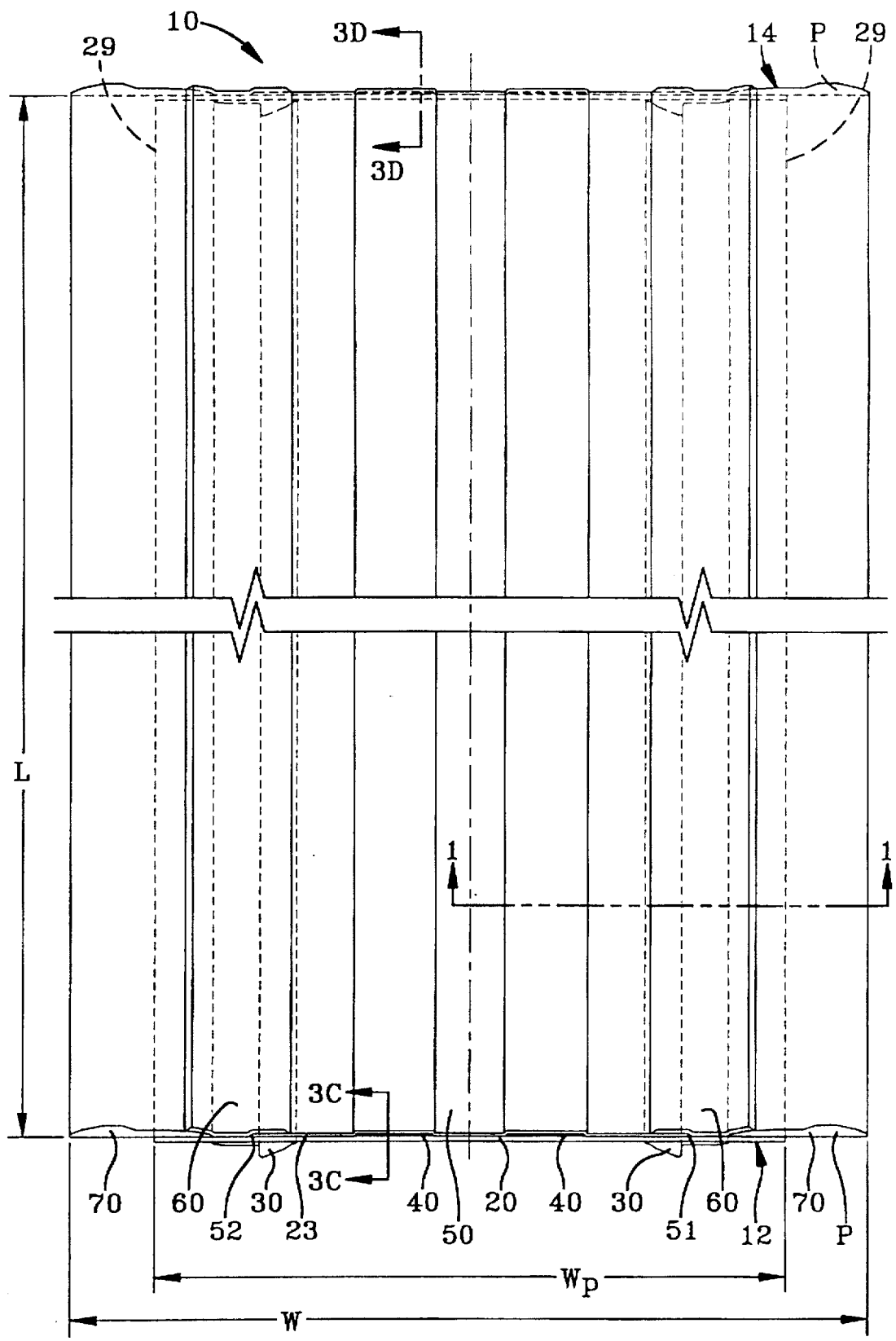
FIG. 2A is a partial plan view of the carcasses inner surface with components attached.
Figure 2B:
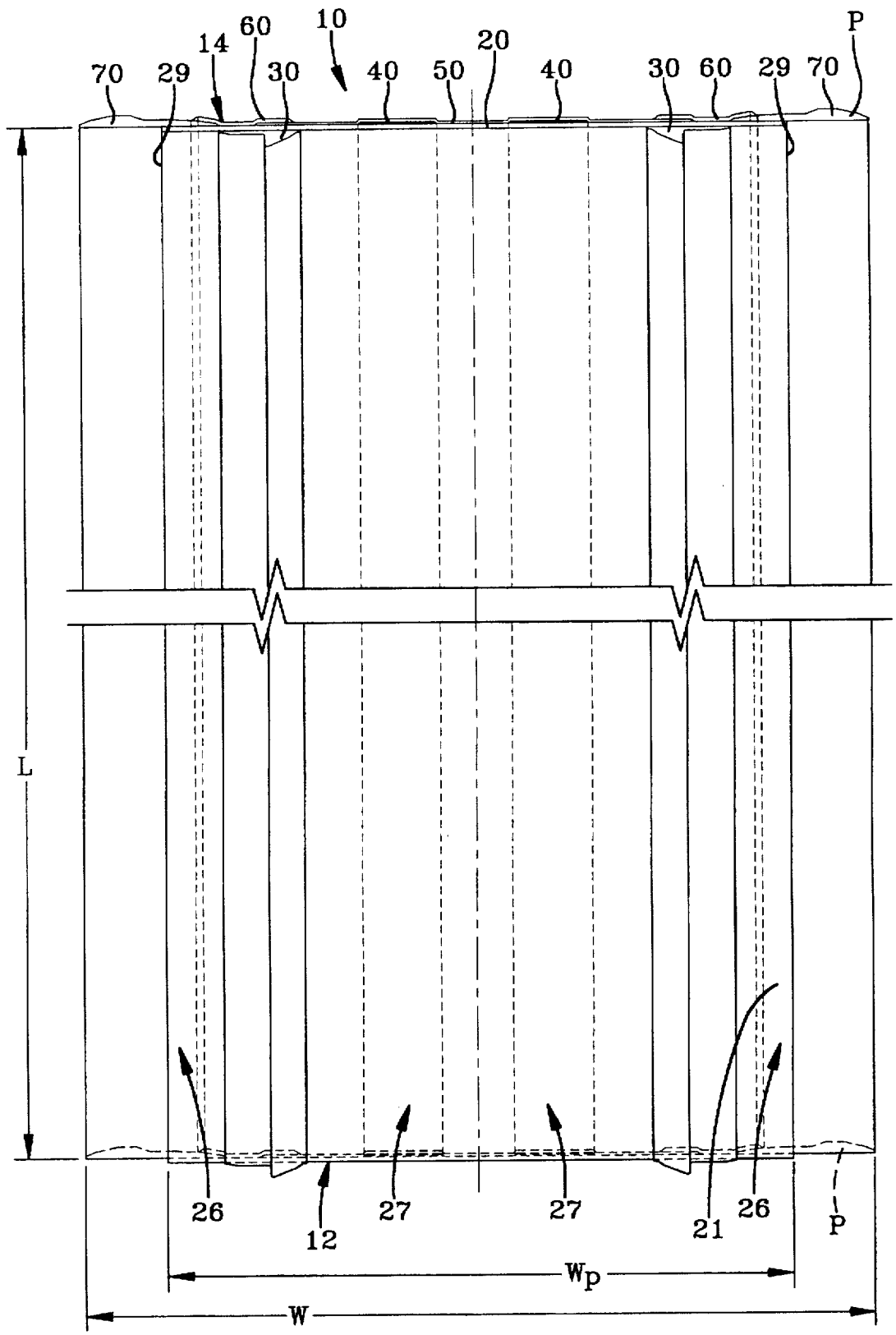
FIG. 2B is a partial plan view of the carcasses outer surface with components attached, both views FIGS. 2A and 2B being slightly inclined to depict the cut ends 12 and 14.
Figure 5:
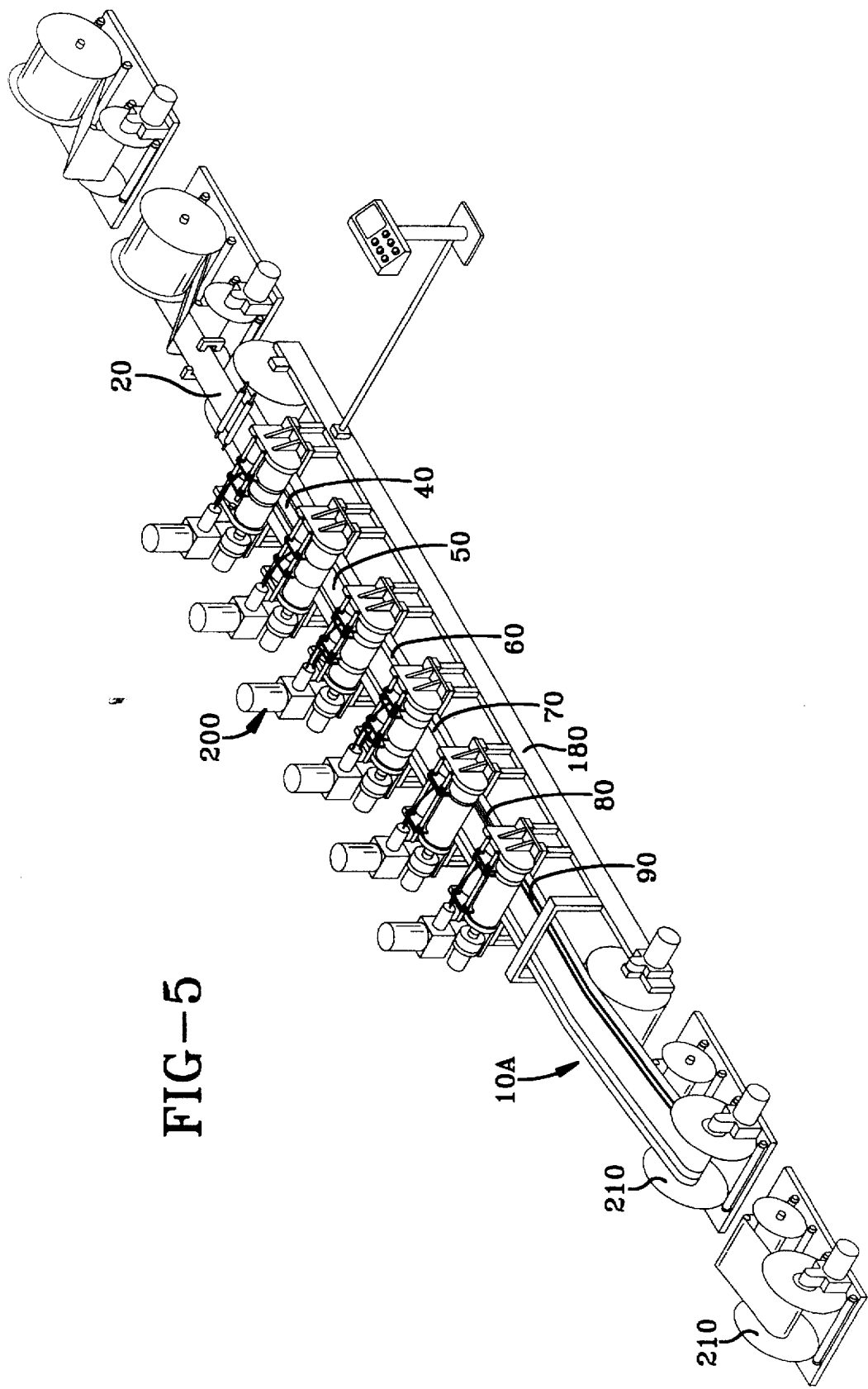
FIG. 5 is an illustration of the preferred apparatus employed to form and assemble the carcass.

The laminate 10A, when manufactured as shown in FIG. 5, can be made into a continuous roll 210. The carcass material in the form of a laminate 10A can then be, in its preassembled state, stored in large rolls 210 which when sent to a tire building station is cut to a precise length (L) by the unique cutting apparatus 100 of the present invention. The cut-to-length carcass 10 as shown in FIGS. 2A and 2B is then formed into a cylindrical shape as shown in FIGS. 4A and 4B.

FIG. 1 depicts a cord reinforced elastomeric member 20, the elastomeric member being a ply for a pneumatic tire, the ply 20 being reinforced with parallel cords 22 which are encapsulated in unvulcanized rubber 24. As shown in FIG. 2B, the ply 20 has a width ($W_p$) and a length (L). The ply 20 has a pair of turnup portions 26 located at the lateral extremes of the ply 20. Each turnup portion 26 extends axially outwardly to a lateral end 29 of the ply 20.

Attached to an outer surface 21 of the ply 20 is a pair of apexes 30. The apexes 30 are located on the ply adjacent to the turnup region 26 at a position to wrap about and primarily above a bead at a later tire building assembly procedure. The bead preferably employed is a cable bead type.

Axially inward of the apex 30 and attached to an inner surface 23 of the ply is a pair of shoulder gum strips 40. The shoulder gum strips act as a rubber reinforcement in the shoulder portion 27 of the carcass 10.

A liner component 50 is attached to the ply and over the shoulder gum strips 40. The liner 50 creates an air impervious barrier for the radially inner air chamber of the tubeless type tire. The liners are generally comprised of halobutyl rubber. The liner 50 has an axial width narrower than the ply 20. The liner width is sufficient to traverse axially outward of the beads when the tire is formed thus forming an air tight chamber between the tire and the wheel upon assembly.

A chafer component 60 is shown at each lateral end 51, 52 of the liner 50. The chafer is attached to the liner 50, to the inner surface 23 of the ply 20, and slightly overlaps the sidewall component 70. The chafer 60 is positioned axially to provide a tough rubber reinforcement between the tire and the rim flange of the wheel and is accordingly located in the bead region of the tire.

A sidewall component 70 is shown attached to the ply and extends laterally outward of the lateral ends 29 of the ply 20. The sidewall 70 is slightly overlapped by the chafer 60. Optionally, to build an outline white letter tire or a whitewall tire, a whitewall strip 80 and a cover strip 90 may be added to the laminate 10A as shown in FIG. 5.

It is believed preferable in cases where a non cable bead is used in the tire construction that the apex 30 be added at a later stage as is shown in FIG. 5. This enables the laminate 10A to be wound into large rolls 210 without any distortion of the calendered components. Alternatively, in cases where an apex 30 and cable bead is used it is believed preferable to couple the carcass assembly apparatus 200 of FIG. 5 to one or more tire building machines without requiring the laminate 10A to be rolled onto the spool 210. This enables the cut-to-length carcass 10 to be manufactured free of any potential distortions caused by handling and storage. In the latter case where an apex 30 is employed, the cutting of the article should occur between the forming of the laminate 10A and applying the cut-to-length carcass 10 to the tire building machine.

The above description of the laminate 10A includes all the elastomeric components required to build a tubeless tire carcass 10 as it is defined in this patent application.

The terms laminate 10A as used throughout this application refer to the assembly of components prior to being cut to a predetermined length. Once cut to length, the term carcass 10 is used to refer to the article which when formed into a cylindrical shape on a tire building drum 5 becomes a carcass for a radial ply tire.

In practicing the invention, a supported laminate 10A is cut forming a first inclined surface or end 12, moved a predetermined distance in a direction parallel to its length and after being so moved, the laminate 10A is cut a second time, thereby forming a cut section of laminate, hereinafter called a carcass 10, having surface areas at the sections opposite ends 12,14, the surface areas 12,14 being spaced a predetermined distance required to enable the ends 12,14 to be spliced together in forming a cylindrical carcass 10 from the cut section. This unique cutting of a laminate 10A is described in detail below.

FIGS. 2A and 2B depict the first end 12 and the second end 14 respectively of the carcass 10. Both ends 12 and 14 are cut along an axial or a lateral extending substantially straight line path, the path being substantially parallel to the cords 22 of the ply 24. This substantially straight line cutting creates a first end or surface area 12 and a second end or surface area 14. The surface areas 12 and 14 are inclined at an angle θ greater than 60° relative to a normal plane (NP), the normal plane (NP) being perpendicular to the ply 20 and substantially parallel to the cords 22 of the ply 20. In the preferred embodiment the angle θ is about 80°. This high angle of inclination provides a large surface area of adhesion between the two ends 12,14 which are spliced at the tire building drum 5 as shown in FIGS. 4A and 4B. The carcass assembly 10 is shown wrapped about a tire building drum 5. The carcass ends 12 and 14 have two inclined substantially flat planar surfaces lying in planes P. The operator splices the ends 12 and 14 together along the plane P. As shown in FIG. 4A the preferred method of cutting creates ribs or ridges 81 and grooves or valleys 82 along the cut surfaces 12 and 14. The substantially parallel ridges 81 and valleys 82 further enhance the surface adhesion.

With reference to FIGS. 3A,3B there is shown an enlarged transverse view of the cut of the laminate 10A being cut by a cutting element 120, the cutting element as shown being an oscillating wire 120. The oscillating wire 120 cuts a roll of cut of the laminate 10A into cut-to-length carcasses 10.

Figure 6:
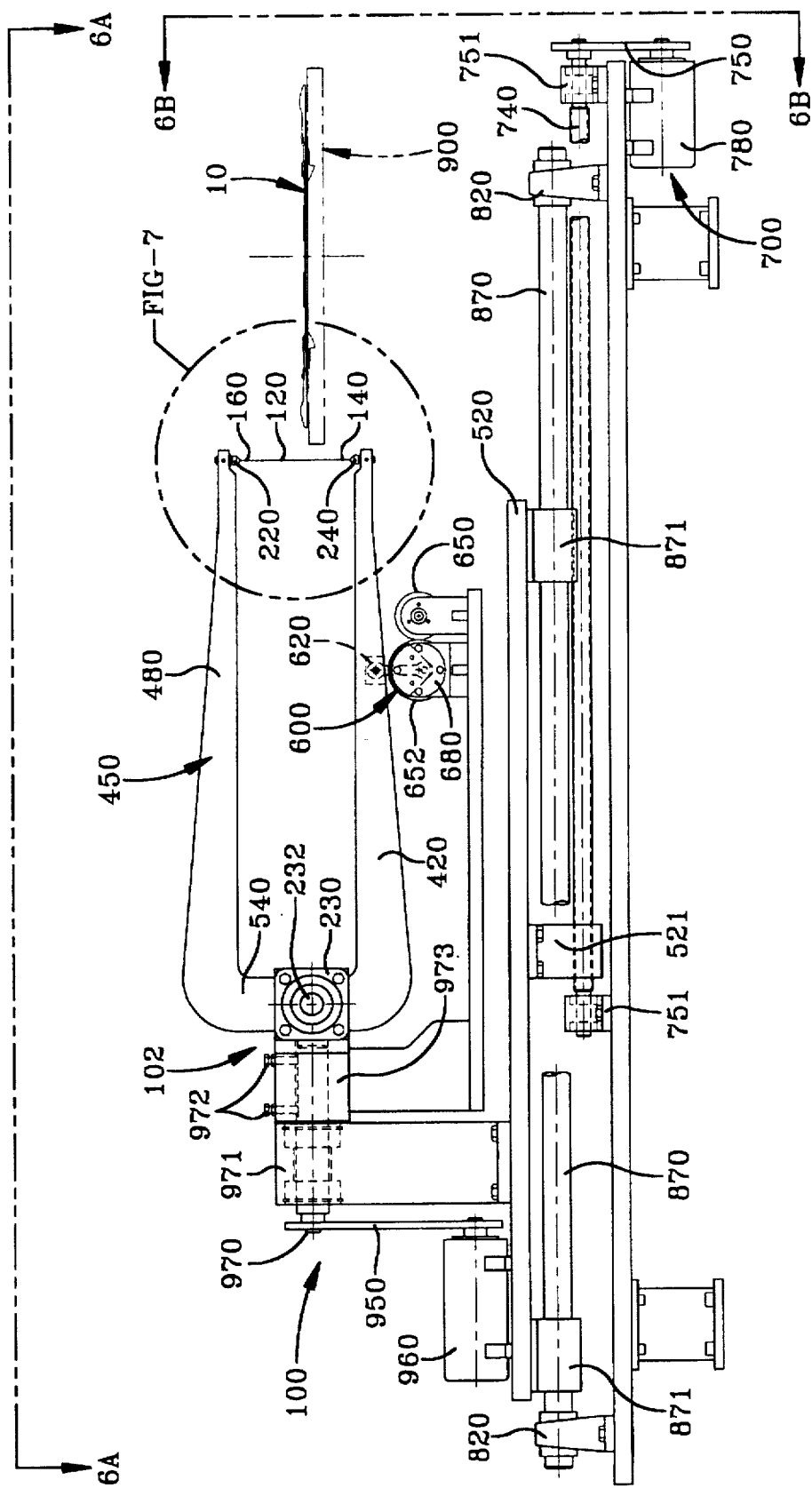
FIG. 6 is a front view of the preferred cutting apparatus, made in accordance to the invention.
Figure 6A:
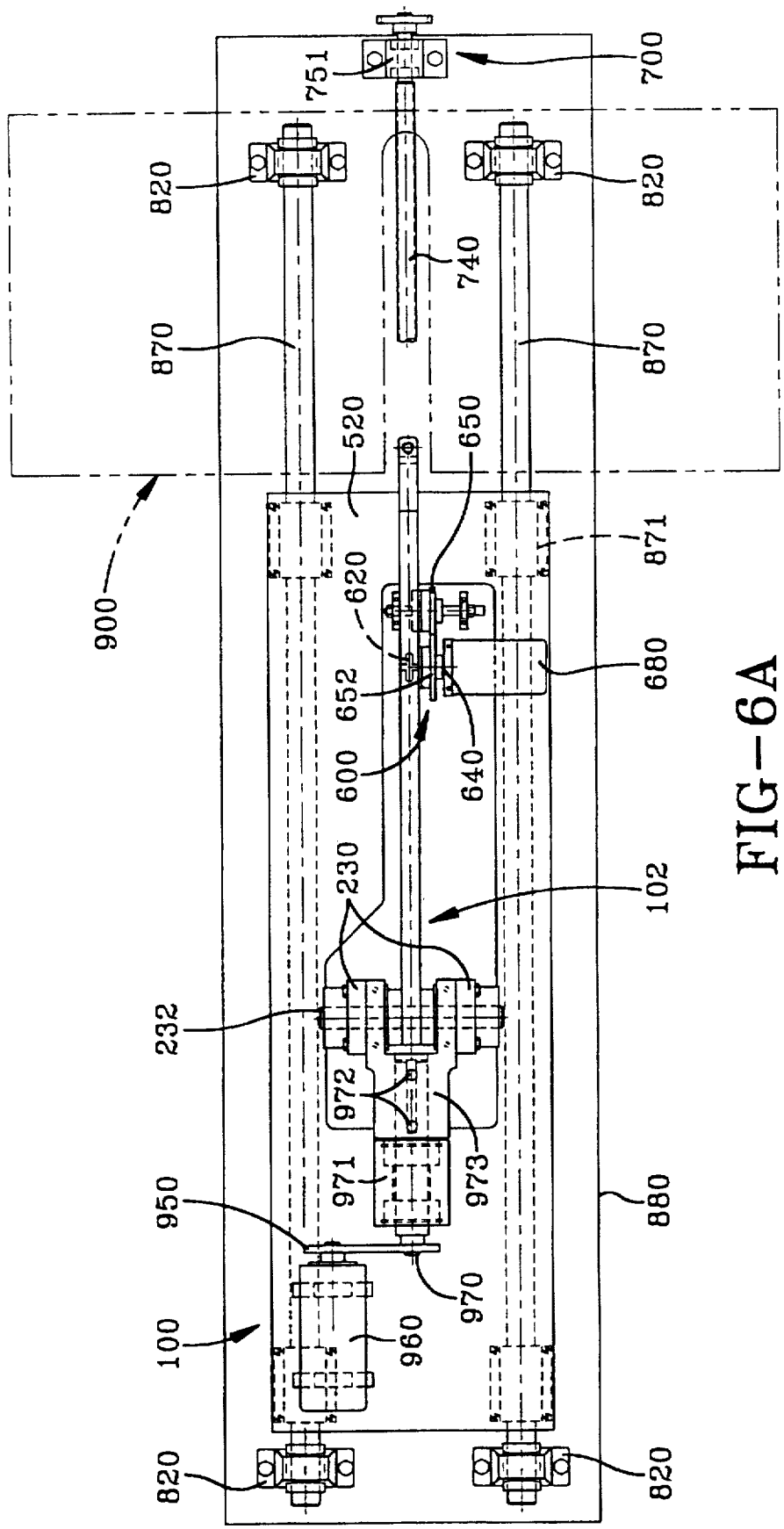
FIG. 6A is a top view of the apparatus of FIG. 6.
Figure 8:
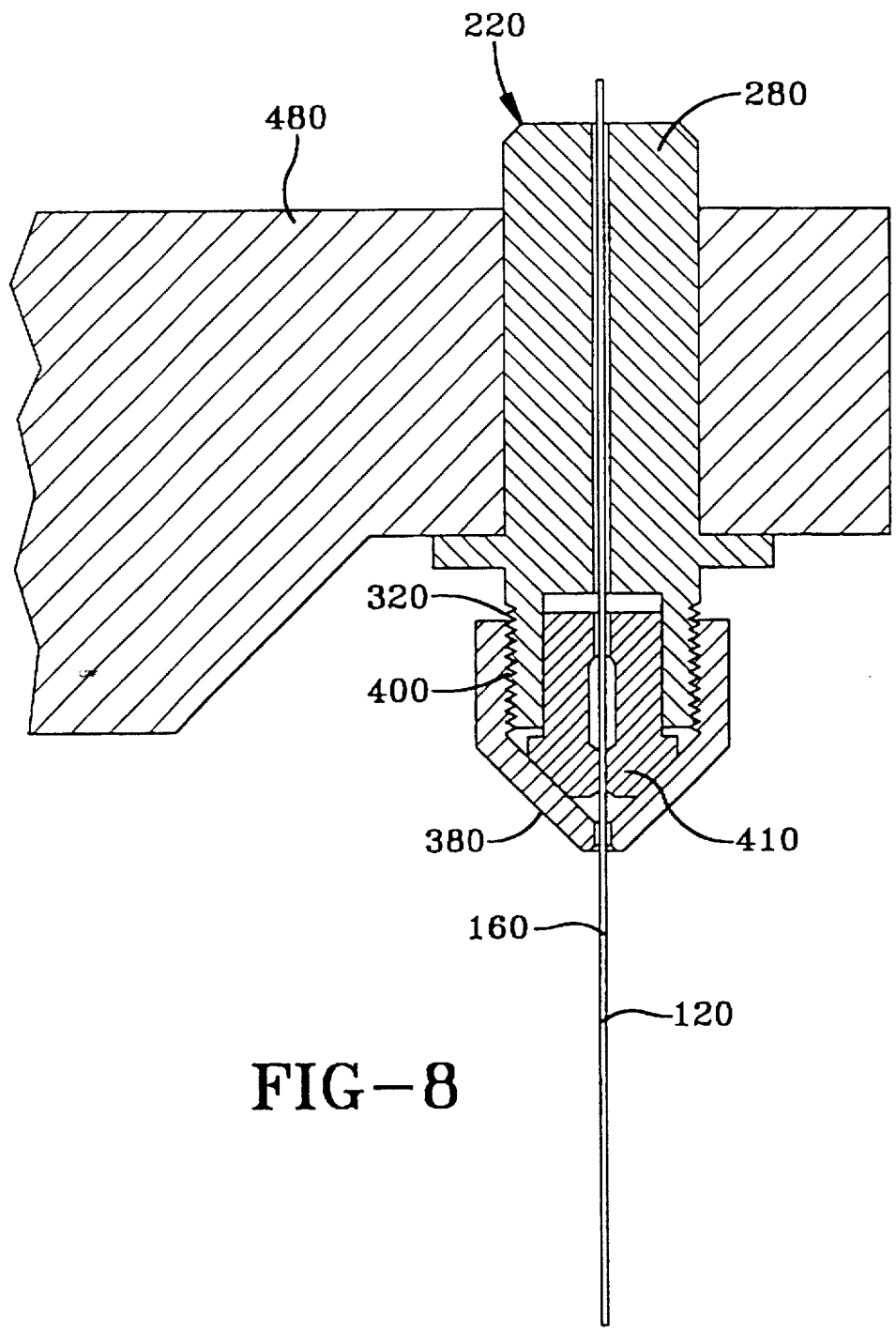
FIG. 8 is an enlarged fragmentary view partially shown in cross section, of the securing means or collets shown in FIGS. 6 and 7.

FIG. 6 shows a front view of the preferred cutting apparatus 100 according to the invention. The preferred apparatus 100 includes cutting means 102 which includes a cutting element 120. The cutting element 120 is preferably a wire made of high tensile steel and has a first end 140 and a second end 160. The wire 120 is preferably round in the cross section and has a diameter between 0.2 millimeters and 1.3 millimeters. The preferred wire of this embodiment has a diameter of 0.3 millimeter (0.012 inches) and a smooth surface finish The first and second ends 140,160 of the wire 120 are secured within securing means. The preferred securing means of this embodiment are collets 220,240. With reference to FIG. 8, an enlarged view of collet 220 is illustrated The following description of collet 220 also applies to collet 240. The collet 220 includes the first inner cylindrical housing 280 having an outer threaded surface 320. The collet 220 also includes a second outer cylindrical housing or thumb nut 380 having an inner threaded surface 400 for engaging the threads on the outer surface 320 of the first housing 280. The thumb nut 380 can be rotated relative to the first housing 280 to secure and tension the second end 160 of the wire 120 within a collet body 410. Preferably the wire 120 is placed in tension when in normal operation.

With reference to FIG. 3B the wire 120 is shown in an inclined position, i.e., the wire makes an angle θ with respect to a plane (NP), plane (NP) being perpendicular to the cord reinforced elastomeric ply 20 and parallel to the cords 22 within that material. The angle θ preferably is greater than 60° although the preferred angle is greater than 70°, essentially about 80°. Some experimental tires were made having a laminate carcass 20 cut an angle θ of 82°. As shown in FIGS. 3B,3C and 3D the cut ends adjacent the cord 22 actually bend the wire cutter 120 such that a small fraction of the cut end does not lay in the plane P, the cut ends 12 and 14 nevertheless are substantially entirely in plane P except for this small deviation at the cords 22. Accordingly for the invention the cuts are considered substantially linear.

Figure 6C:
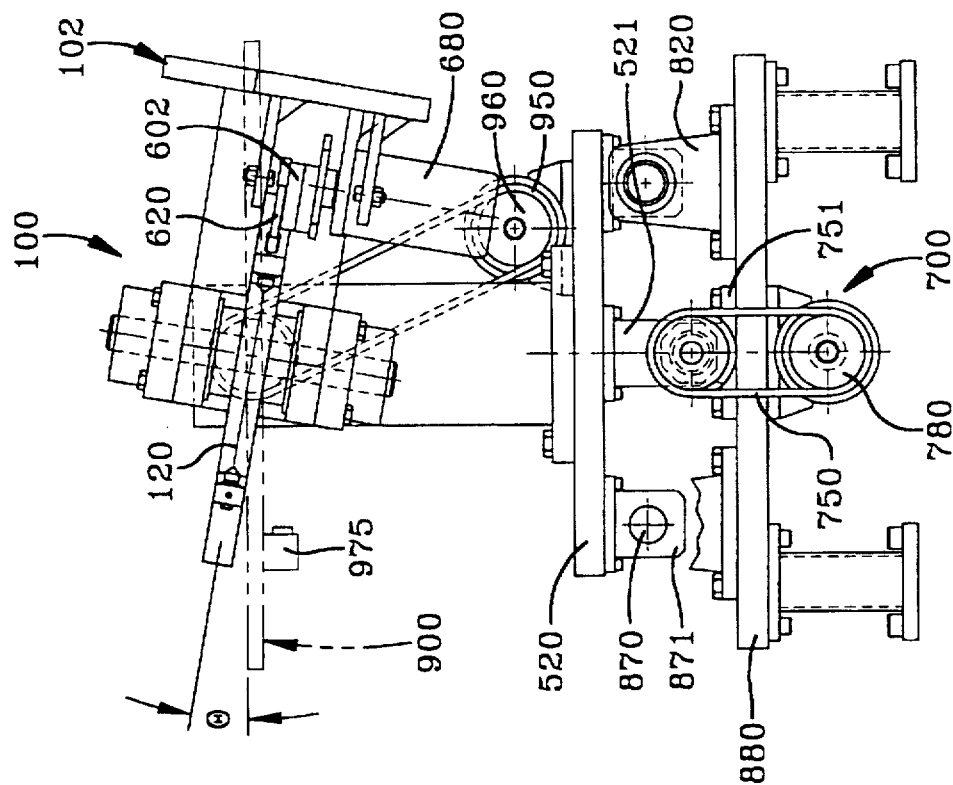
FIG. 6C is an end view with the cutting means oriented at an angle θ.
Figure 6B:
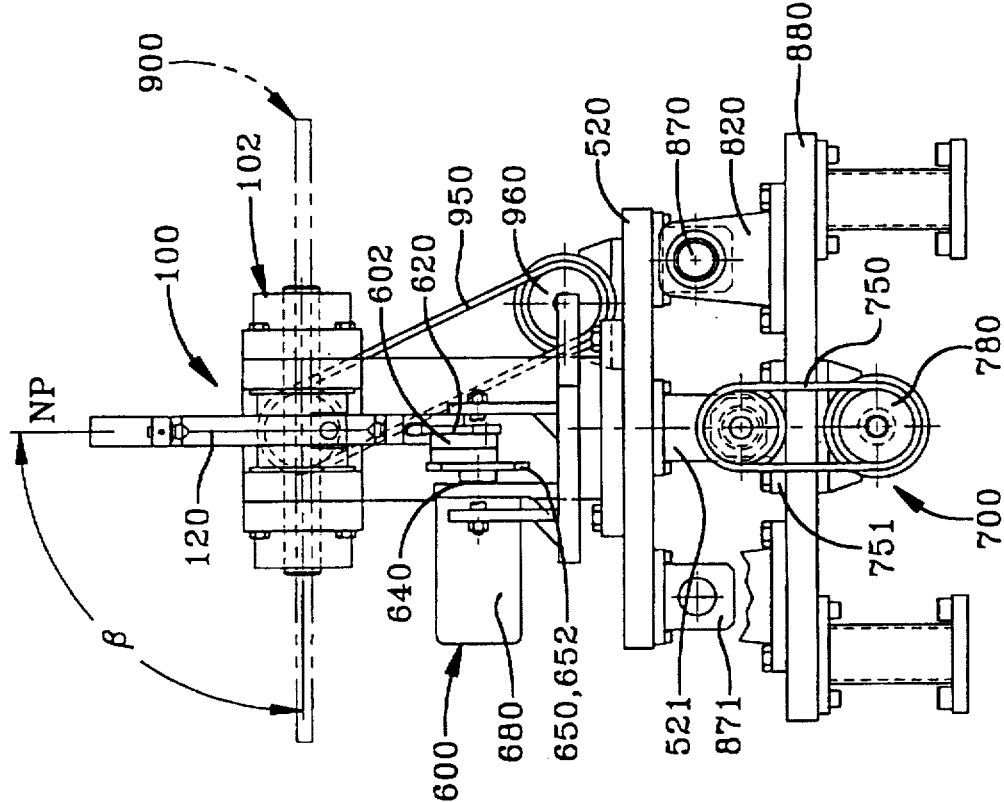
FIG. 6B is an end view with the cutting means oriented at an angle β.

The laminate 10A is cut along a majority of its width and thickness while maintaining the cutting element 120 that engages the laminate 10A at an angle θ as shown in FIGS. 3B, 3C, and 3D. These cuts are best accomplished if the laminate 10A is supported by a surface, preferably being supported on both sides of the cutting element 120. As shown in FIG. 6C, the support means 900 is slotted to allow the cutting element to pass through the laminate 10A. If the cutting action has a high peak to peak amplitude, it may be desirable to clamp or hold the laminate to the support means 900.

With continuing reference to the apparatus 100 as shown in FIGS. 6, 6A–6C, the arms 420 and 480 are oscillated for reciprocating movement of the wire 120 at a predetermined oscillation rate. In the preferred embodiment, the means 600 for creating reciprocating movement is an eccentric 602 which is affixed to a crank gear 652 which is connected to a second gear counter balance 650 attached to an output shaft 640 of a variable speed motor 680. The eccentric 602 is pivotally connected to the first arm 420 by a crank arm 620. The variable speed motor 680 can be adjusted, the shaft 640 rotated thereby, so that the oscillating rate can vary up to about 2,000 cycles per minute while having a full peak-to-peak amplitude up to 2.5 cm. Higher oscillating rates are achievable using lower amplitudes and higher amplitudes are achievable with generally lower oscillation rates. In the preferred embodiment, the oscillating rate is adjustable based on parameters such as the thickness and type of elastomeric member being cut and the transverse speed of the wire 120. One preferred combination is an oscillating rate of 1,200 cycles per minute and a transfer speed of about 1 centimeter per second.

The cutting means 102 further comprises a slidable frame 520 and a means 700 for creating relative motion between the wire 120 and the elastomeric material to be cut by the cutting means 102. In the preferred embodiment, the means 700 comprises a ball screw 740 attached to pillow blocks 751, the ball screw 740 being driven by a variable speed motor 780 which powers a belt assembly 750 which is connected to the ball screw 740. The frame 520 is mounted on linear bearings 871 slidably supported on rods 870 which are fixed in shaft brackets 820, the brackets 820 being mounted on a stationary support 880 to provide low friction movement of the frame 520 relative to the stationary support. The frame 520 is connected to the ball screw 740 via the threaded bracket 521.

In operation, an elongated laminate 10A consisting of elastomeric components and a cord reinforced ply suitable for use as a tire carcass 10 is placed on a means 900 for supporting the laminate, the means 900 may be a substantially flat plate or table having a slot for the cutting element 120 to traverse, the slotted plate supporting the laminate 10A while it is being cut. The motor 680 is started causing the crank arm 620 to oscillate a "C" arm 450, the "C" arm 450 having a first arm 420 which is integrally part of or connected to a second arm 480 by a center link 540 causing the second arm to oscillate to provide for oscillation of the cutting wire 120. In practice, the "C" arm 450 can be structurally lightened by machining away or milling material away from the "C" arm 450, preferably while maintaining the arms 450 structural rigidity. For this purpose a plurality of holes or slots can be cut into the "C" arm 450. The motor 780 is then actuated for moving the frame 520 to the right as shown toward a position adjacent to motor 780 and to engagement with the elastomeric laminate 10. Alternatively, the "C" arm 450 can have a means for oscillating the wire 120 only, the means being a small high speed pneumatic cylinder which is attached directly to the wire. The means (not illustrated) can oscillate the wire 120 in a similar fashion as the above-described mechanism.

As the oscillating wire 120 engages the elastomeric laminate 10A it forms a slit in the material. Then, as the wire advances through the carcass material 10A, the wire 120 displaces the material ahead of the slit in small increments so that the wire 120 can advance evenly. It is believed that cutting is facilitated by the adherence of a contact layer of the elastomeric material to the wire 120 which takes place until the limit of shear stress for contact layer is reached. As shown in FIG. 4A the cut splice surface may be striated by the process which provides a surface with parallel rib or ridges 81 and groove or valleys 82 smeared by the oscillating reciprocating wire 120. The preferred wire 120 has a smooth outer surface which is believed to enhance this rubber smearing action. The use of a grit or roughened surfaced wire 120 would also provide a proper angular cut surface, however, these cutting wires are more expensive and, therefore, are not preferred. The cut surface being smeared is found to be desirable for splicing cut ends 12,14 of the carcass 10.

Although it is believed ideal for the oscillating wire 120 to be maintained at a constant angle throughout the cutting of the carcass 10 it has also been determined that it is preferable to change or alter the orientation of the wire relative to the ply just prior to the wire 120 entering into cutting engagement of the ply 20. As shown in FIG. 3A, if the wire 120 is reoriented to an angle β, β being less than the angle θ, it has been determined that the wire 120 will reliably enter into the cord reinforced ply material in a repeatable fashion. Once entry into the ply 20 is made the oscillating cutting wire 120 can then be reoriented back to the angle θ as shown in FIG. 3B and a complete cutting across the axial width of the member can be finished as shown in FIG. 3C. It has been observed that when cutting closely spaced cord reinforced material, the oscillating wire 120 should preferably be oriented at an angle β, β being less than 45° relative to the plane (NP) just prior to the wire entering into the ply cord region, β preferably the wire being oriented about 0° relative to the plane (NP). This ensures that the oscillating wire 120 does not impact or cut into a cord 22 upon entry, thereby, preventing the oscillating wire cutting means from damaging the laminate.

The apparatus 100 as described above, is capable of cutting rather thin cord reinforced elastomeric sheet material. A means 960 can be provided to set or fix the angular orientation of the cutting element 120. Additionally, the means 960 can be provided to change the orientation of the cutting element 120 as it cuts. The means 960 as shown is a actuating motor connected to the belt assembly 950. The belt assembly 950 is connected to a rotatable shaft 970 which is connected to the "C" arm 450 through the housing bracket 971 and fixed to the bracket 973 as illustrated in FIG. 6 by the fasteners 972, the arm 450 pivotally connected to the bracket 973 by bracket 230 and shaft 232. When actuated, the motor 960 can rotate the belt 950 from a first orientation to a second orientation and can reverse orientation upon reactivation. A proximity switch 975 is triggered as the cutting means traverses across the laminate 10A thus activating the motor 960. The oscillating wire cutter 120 can enter the laminate 10A oriented as shown in FIG. 3B at an angle θ of 60° or more relative to a plane perpendicular to the ply 20 and parallel to its cords 22. Upon entry into the cord reinforced ply a short distance, the oscillating wire cutter traverses and can be actually guided through the cutting process by maintaining contact with an adjacent rubberized cord. The rubberized cord acts as a guide for the oscillating wire cutter as is shown in FIG. 3B.

The apparatus 100 as described above, using a round oscillating wire cutter 120 guided by the cords 22 of the reinforced elastomeric laminate 10A upon which it is cutting, provides an extremely reliable and safe means for cutting the cord reinforced member 10 without damaging any of the cords 22. Secondarily and of equal if not greater importance the oscillating wire cutter 120 being oriented at the relatively high angle θ over substantially the entire width of the laminate 10A enables the reinforced member to be cut at an angle heretofore believed to be unachievable. This large angular cut provides substantially flat planar surfaces 12,14 lying in the plane P for splicing a cylindrical carcass 10. These surfaces 12,14 provide excellent adhesion and have enabled the carcass components be laminated directly onto the cord reinforced ply stock 20 prior to cutting the laminate 10A. This greatly facilitates the manufacture of a pneumatic tire carcass 10 and results in extremely high levels of efficiency.

The oscillating action of the wire 120 tends to smear the rubber as it cuts the elastomeric material. Therefore, when cutting through a carcass 10 having a whitewall or outline white letter strip component 80 it is believed that the smearing must be kept to a minimum. Since this white material is axially outboard of the ply end 29, it is possible to simply guillotine cut that portion of the sidewall and then let the inclined wire 120 pass through the pre-cut slit prior to the wire 120 initiating its oscillating cutting of the remainder of the laminate 10A.

Alternatively, it is possible to limit the wire oscillation amplitude to a fraction of an inch to reduce the amount of smearing. This method is preferred because it enables the laminate to have the surfaces inclined almost entirely at the angle θ.

In either case the cutting must be such as to prevent smearing of the white material along the splice lines 14,16.

As can be seen from the above description the apparatus and method of cutting a cord reinforced elastomeric member as disclosed is extremely simple and reliable and yet provides for a splice joint that is superior to those known in the prior art.

It is believed feasible that other than a wire cutting means 102 could be employed to cut the elastomeric article. For example, the cutting means 102 may employ an ultrasonic cutter, a water jet cutter, a laser cutter or any number of alternative cutting elements 120. While such alternative cutting means may be within the scope of the invention it must be remembered that the cutting action should not damage the reinforcement cords. Applicants have attempted several alternatives to the smooth cutting wire 120, however, these alternatives appear to be more complicated and more prone to damaging cords.

What is claimed is:

1. A method of cutting a cord reinforced elastomeric laminate, the laminate having a length, a width and a thickness, and including at least one cord reinforced elastomeric radial ply, the ply having parallel cords oriented at an angle about 90° relative to the length of the laminate, and a plurality of elastomeric components laminated to the ply, the method of cutting the laminate comprising the steps of:

cutting the laminate across a majority of the width and thickness of the laminate at an angle θ greater than 60° relative to a plane (NP), the plane (NP) being perpendicular to the ply and parallel to the cords in the ply, the cutting being accomplished by passing a cutting element through the ply and laminated components to be cut, the cutting element being passed between two adjacent parallel cords of the ply;

changing the angle θ prior to cutting the ply by changing relative position of the cutting element and the ply to an angle β, β being measured relative to the plane, the plane perpendicular to the ply and parallel to the cords, β being less than θ;

cutting into the ply a short distance sufficient to position the cutting element between the two parallel cords; and reorienting the cutting element relative to the ply to the angle θ and continuing to cut the laminate across said width.

2. The method of cutting the laminate, as in claim 1, wherein the angle θ is about 80°.

3. The method of cutting the laminate as claimed in claim 2, the method further comprising the step of:

guiding the cutting element as the cutting element traverses through the cord reinforced elastomeric ply, the cutting element being guided by one of the adjacent cords along a cutting path.

4. The method of cutting the laminate as in claim 1, the method further compromising the step of:

oscillating the cutting element as the cutting element cuts through the laminate.

5. A method of cutting an uncured rubber laminate, the laminate having a fixed width, a thickness and a length longer than required, to a predetermined length, the laminate after cutting being used to form a carcass for a radial ply pneumatic tire, the laminate having a ply that becomes radially oriented in the tire, the ply being reinforced by parallel cords oriented at an angle of about 90° relative to the length of the laminate and two or more non-reinforced elastomeric components laminated to the ply, the method of cutting comprising the steps of;

a) supporting the laminate at a position spaced from a cutting element;

b) urging the cutting element into cutting engagement with the laminate;

c) orienting the cutting element at an angle θ relative to a plane perpendicular to the ply surface and parallel to the ply cords, the angle θ being greater than 60°;

d) initially cutting the laminate by oscillating the cutting element, the cutting element including a wire that is oscillated within the laminate to create the cut, changing the angle θ prior to cutting the ply by changing relative position of the cutting element and the ply to an angle β, β being measured relative to the plane perpendicular to the ply and parallel to the cords, β being less than θ, cutting into the ply a short distance sufficient to position the cutting element between two parallel cords and reorienting the cutting element relative to the ply to the angle θ, the laminate being cut across a majority of said width and thickness while maintaining a majority of the cutting element that engages the laminate at the angle θ, the cutting element being guided by adjacent parallel cords of the ply;

e) moving the cut laminate a predetermined distance in a direction parallel with said length; and f) cutting the laminate a second time with the cutting element repeating steps c, d and e above, thereby forming a cut section of laminate having cut ends, each cut end having a cut surface area, the cut surface areas being spaced a predetermined distance required to enable the ends to be spliced together in forming a cylindrical carcass from the cut section.

6. The method of cutting the uncured rubber laminate as in claim 5, wherein the step of oscillating the cutting element further includes the step of oscillating the cutting element at a peak-to-peak oscillation amplitude less than 25 mm.

7. A method of cutting an intermediate article of manufacture to a predetermined length, the article having a width and being a carcass for a pneumatic tire, the carcass being an uncured elastomeric laminate assembly having a radial ply, the ply being reinforced by parallel cords, and two or more non-reinforced elastomeric components laminated to the ply, the method of cutting comprising the steps of:

a) supporting the article at a position spaced from cutting means, the cutting means having a cutting element;

b) orienting the cutting element at an angle θ relative to a plane perpendicular to the ply length and parallel to the ply cords, the angle θ being greater than 70°;

c) cutting the article across a majority of said width forming a first cut having two substantially flat planar surface areas substantially parallel to the ply cords, the surface areas being inclined at an angle of about θ, one cut surface area being a leading end of one carcass and the other a trailing end of a second carcass;

d) changing relative orientation of the ply and the cutting element to a second angle β, wherein β is less than θ, prior to the cutting element entering the ply;

e) cutting into the ply and after the cutting element enters the ply, changing relative position of the ply and the cutting element to the angle θ, and then cutting the article across remainder of said width.

8. The method of cutting the intermediate article of manufacture as claimed in claim 7, the method further comprising the step of:

f) guiding the cutting element as the cutting element traverses through the ply between two adjacent parallel cords, the cutting element being guided by an adjacent cord.

9. The method of cutting the intermediate article of manufacture as in claim 9, further comprising the steps of:

f) moving the article a fixed predetermined distance from the first cut flat planar surface areas; and g) cutting the article across a majority of said width a second time maintaining the cutting element at the angle θ forming a second cut having two substantially flat planar surface areas, the predetermined distance between the the first cut and the second cut establishing the predetermined article length.

10. The method of cutting the intermediate article of manufacture as claimed in claim 9, the method further comprising the step of:

guiding the cutting element as the cutting element traverses through the article between two adjacent parallel cords, the cutting element guided by one of the adjacent cords.

* * * * *